United States Patent
Francois et al.

(10) Patent No.: US 7,269,158 B2
(45) Date of Patent: Sep. 11, 2007

(54) METHOD OF OPERATING A CROSSBAR SWITCH

(75) Inventors: Abel Francois, Rueschlikon (CH); Bernd Leppla, Buchen-Boedigheim (DE); Ronald Peter Luijten, Horgen (CH); Norbert Schumacher, Neuhausen (DE)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 10/378,410

(22) Filed: Mar. 3, 2003

(65) Prior Publication Data

US 2004/0047334 A1 Mar. 11, 2004

(30) Foreign Application Priority Data

Mar. 6, 2002 (EP) .................................. 02004990

(51) Int. Cl.
*H04L 12/28* (2006.01)
(52) U.S. Cl. ...................................... 370/351; 370/390
(58) Field of Classification Search ................ 370/390, 370/235, 416, 418
See application file for complete search history.

(56) References Cited

U.S. PATENT DOCUMENTS

| | | | | |
|---|---|---|---|---|
| 4,623,996 A | * | 11/1986 | McMillen | 370/418 |
| 6,477,174 B1 | * | 11/2002 | Dooley et al. | 370/416 |
| 6,515,991 B1 | * | 2/2003 | McKeown | 370/390 |
| 6,721,273 B1 | * | 4/2004 | Lyon | 370/235 |

* cited by examiner

*Primary Examiner*—Chi Pham
*Assistant Examiner*—Albert T. Chou
(74) *Attorney, Agent, or Firm*—John E. Campbell; Floyd A. Gonzalez

(57) ABSTRACT

Apparatus and method of operating a crossbar switch (1) having a control logic, an output port scheduler (2), n input ports (i_0, ..., i_31) and m output ports (o_0, ..., o_31), wherein information packets are routed from said n input ports to said m output ports, and wherein said output port scheduler (2) controls the sequence of packets output at said output ports (o_0, ..., o_31). To ensure fairness regarding packet transfer/routing and the packet sequence, an input port number corresponding to the input port a new information packet is arriving at is stored in round-robin mode in a port number buffer (pnb_0). For output, said input port number is retrieved from said port number buffer (pnb_0) in round robin mode, too, and with this port number, address information regarding the packet is obtained from a control logic buffer of the crossbar switch (1).

12 Claims, 2 Drawing Sheets

METHOD OF OPERATING A CROSSBAR SWITCH

BACKGROUND OF THE INVENTION

The present invention relates to a method of operating a crossbar switch having a control logic, an output port scheduler, n input ports and m output ports, wherein information packets are routed from said n input ports to said m output ports, and wherein said output port scheduler controls the sequence of packets output at said output ports.

The present invention further relates to a crossbar switch having a control logic, an output port scheduler, n input ports and m output ports, wherein information packets are routed from said n input ports to said m output ports, and wherein said output port scheduler controls the sequence of packets output at said output ports.

The present invention also relates to a networking system.

Crossbar switches are used in high performance computer systems and nodes of electronic networks such as communication networks to route an information packet arriving at an arbitrary input port to a specified output port.

A crossbar switch comprises n input crossbars each of which is assigned to one of said n input ports and m output crossbars each of which is assigned to one of said m output ports. An intersection of an input crossbar with an output crossbar is called crosspoint.

The routing of an information packet within a crossbar switch is controlled by a control logic that keeps track of incoming information packets. The control logic analyses header data of said information packets and stores address information related to said information packets in a buffer system whose buffer elements are most often assigned to a specific crosspoint. The payload of said information packets is stored in a buffer system, too.

Storing said address information and the corresponding payload avoids packet losses e.g. in case of multiple packets requiring to be routed to the same output port.

Advanced crossbar switches can handle information packages of different priorities. This feature ensures that packets with higher priority are routed to a specific output port first, even if packets with lower priority requiring the same output port have arrived at the crossbar switch earlier.

A further advanced feature, which is known as link paralleling, comprises temporarily building a logical input/output port out of several physical input/output ports. The bandwidth of such a logical port is increased by a factor corresponding to the number of physical ports used for link paralleling.

An output port scheduler controls the packet flow at the output ports of the crossbar switch, e.g. by choosing which packet to output next at a specific port. In most cases, there is more than one packet temporarily buffered within one of the buffers associated to an output crossbar. In this case, the output port scheduler has to determine the sequence in which said packets are output.

Important criteria for determining the packet sequence at an output port are fairness, maintaining a certain packet sequence in which distinct packets have arrived at an input port, and avoiding starvation.

Many state-of-the-art crossbar switches use output arbitration schemes based on linked lists, which is a very complex solution with various disadvantages. controlling the packet sequence at an output port using a linked list approach does not guarantee lowest possible latency because of the requirement of traversing linked lists for some operations.

BRIEF SUMMARY OF THE INVENTION

Accordingly, it is an object of the present invention to provide an improved method of operating a crossbar switch which provides for efficient traffic management, in particular concerning the output ports without necessitating a complex control logic within an output port scheduler, while at the same time supporting multiple priority levels and a link paralleling mode.

According to the present invention, this object is achieved by storing an input port number corresponding to the input port at which a new information packet is arriving, in round-robin mode in a port number buffer.

When regarding incoming packets having a common output port as destination, in this context, storing in round-robin mode means that when the first time an input port number of said packets is stored, a first port number buffer is used for storing. The input port number corresponding to the input port a second packet is arriving at is stored to a second port number buffer, and so on.

The number of port number buffers per output crossbar preferably equals the number of input ports. The port number buffers preferably operate as FIFO-buffers.

Such round-robin mode of storing represents a kind of sorting of the incoming packets that provides the possibility of maintaining the packet sequence with few effort.

In a further advantageous embodiment, retrieving input port numbers from said port number buffers in round-robin mode is provided, which enables a very simple arbitration procedure. The output port scheduler only has to cyclically poll the port number buffers which in combination with said round-robin mode of storing is sufficient for maintaining the packet sequence at the output ports.

In a further embodiment of the invention, accessing a control logic buffer by using a retrieved input port number, and obtaining address information from said control logic buffer enables to access the payload of a packet determined for output.

The input port number so retrieved from a port number buffer can be used to access a buffer of the control logic associated with the input port denoted by the input port number. In this way, address information and/or packet header data can be accessed belonging to the next packet of the control logic buffer ready for output. The address data, in turn, can be used for accessing the payload of said packet that is usually stored in a separate buffer.

Generally, a very advantageous embodiment of the present invention provides retrieving packet data with said address information, and—in a second step—outputting a packet comprising said packet data.

As can be seen, the arbitration logic within the output port scheduler is very simple and thus very fast, too. As already mentioned, the round-robin mode of storing/retrieving input port numbers to/from port number buffers automatically keeps track of the packet sequence so that no complex arbitration procedures are required.

Scalability is another advantage of the method presented. A further advantage is predictability of the output scheduler buffer load, i.e. there is no random factor, which is important for performance planning.

BRIEF DESCRIPTION OF THE SEVERAL VIEWS OF THE DRAWINGS

These and other objects will be apparent to one skilled in the art from the following detailed description of the invention taken in conjunction with the accompanying drawings in which.

FIG. 1b shows a crosspoint of the crossbar switch of FIG. 1a, and

DETAILED DESCRIPTION OF THE INVENTION

Figure 1A:
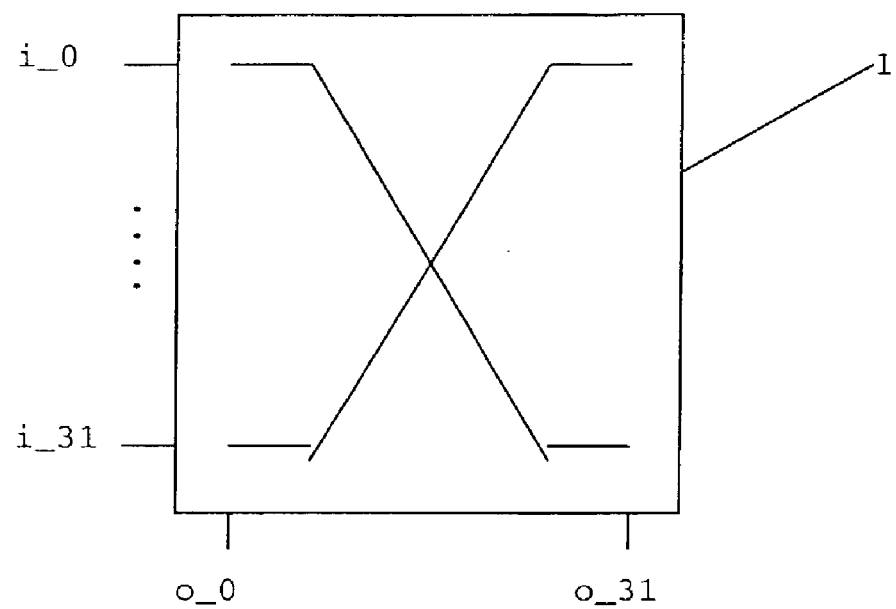
FIG. 1a is a schematic representation of a common crossbar switch.

The crossbar switch 1 schematically depicted in FIG. 1a comprises 32 input ports i_0, . . . , i_31 and 32 output ports o_0, . . . , o_31. It is capable of routing information packets incoming at an arbitrary input port to one of said output ports o_0, . . . , o_31.

Crossbar switch 1 has a plurality of input crossbars (not shown in FIG. 1a), each of which is connected to one of the input ports i_0, . . . , i_31. Further, crossbar switch 1 has a plurality of output crossbars (not shown), each of which is connected to one of the output ports o_0, . . . , o_31.

An intersection of an input crossbar with an output crossbar is called crosspoint 4. A crosspoint 4 represents the physical connection of an input port and an output port via the corresponding input/output crossbars and is schematically shown in FIG. 1b.

Figure 1B:
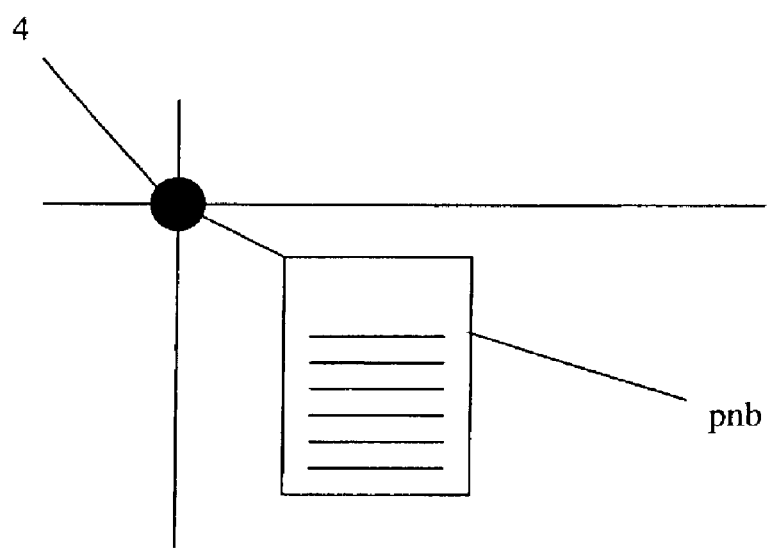

As can be seen from FIG. 1b, a port number buffer pnb comprising a plurality of buffer entries is assigned to said crosspoint 4. The port number buffer pnb is used for temporarily storing the number of an input port at which a packet has arrived.

The crossbar switch 1 (FIG. 1a) has thirty-two output crossbars, each of which has thirty-two port number buffers pnb.

Figure 2:
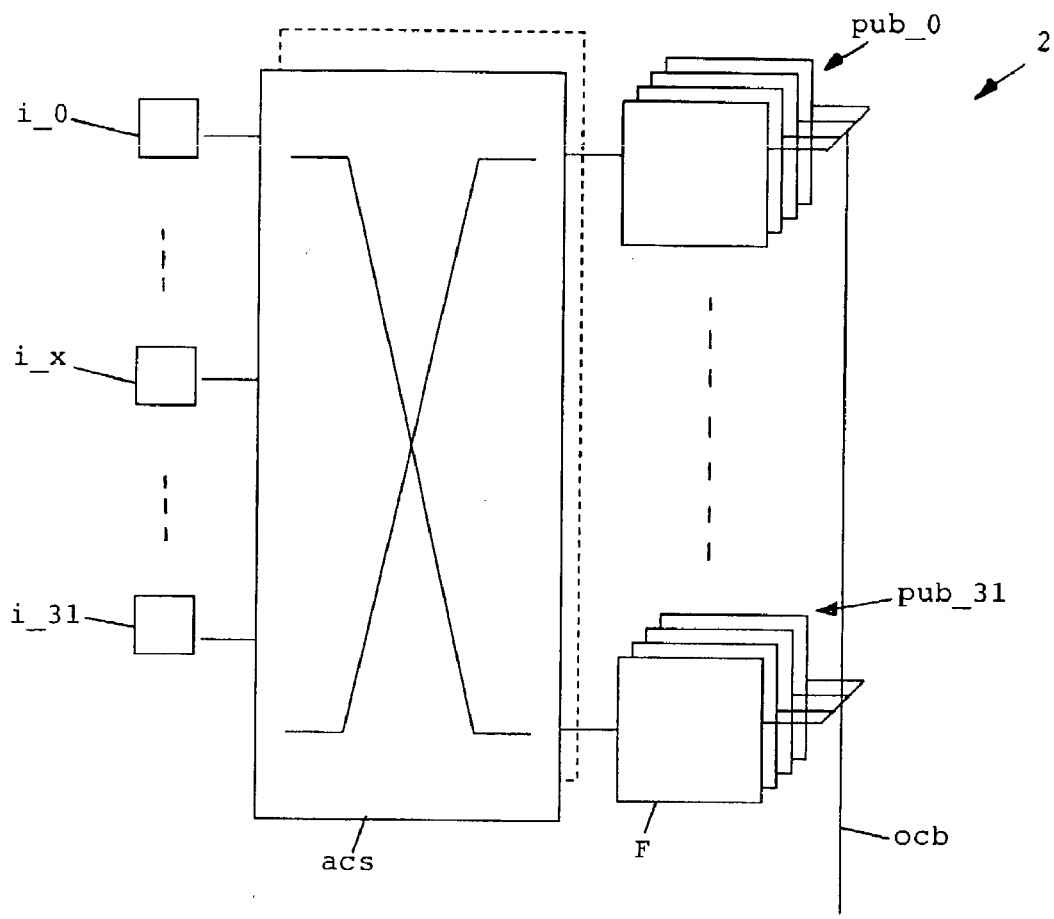
FIG. 2 shows a schematic drawing representing a part of the output port scheduler of the crossbar switch.

The schematic representation of the output port scheduler 2 in FIG. 2 shows an output crossbar ocb. It further shows the input ports i_0, i_x, i_31, wherein the dots between said input ports represent further input ports omitted in FIG. 2 for clarity.

An auxiliary crossbar switch acs connects said input ports i_0, . . . , i_31 to a series of port number buffer pnb_0, . . . , pnb_31. The auxiliary crossbar switch acs enables an incoming packet arriving at an arbitrary input port, or its port number, respectively, to be routed to any of said port number buffers pnb_0, . . . , pnb_31.

Each port number buffer comprises four FIFO buffers F, each of which is assigned to a certain priority level.

Each port number buffer depicted in FIG. 2 is connected to the output crossbar ocb. As with the input ports i_0, . . . , i_31, the vertically placed dots indicate the remaining port number buffers omitted for clarity.

Figure 3:
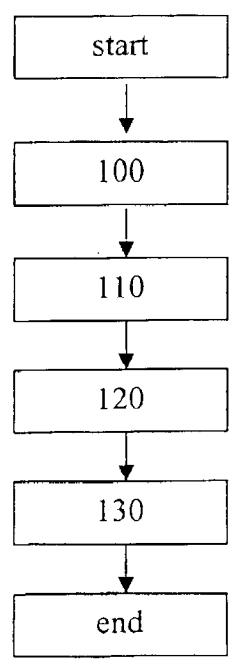
FIG. 3 shows a flow chart depicting the steps of the method according to the invention.

FIG. 3 shows a flow chart depicting the steps of the method according to the invention.

First, in step 100, when a packet is arriving at an input port i_x, the corresponding input port number i_x is stored in a port number buffer. Since storing is performed in round-robin mode, the input port number i_y of the very first packet is stored to the first port number buffer pnb_0, the input port number of a second packet is stored to the second port number buffer pnb_1, and so on. The auxiliary crossbar switch acs enables routing the port numbers to the port number buffers correspondingly.

Payload and/or header data of the arriving packets is stored in a control logic section or a data buffer section of the crossbar switch, respectively. It is not stored within the output port scheduler 2 and its port number buffers.

The further processing of data within the output port scheduler 2 comprises retrieving 110 (FIG. 3) an input port number from said port number buffers pnb_0, . . . , pnb_31. The input port number is also retrieved in round-robin mode, which enables to use a simple control logic within the output port scheduler 2 and which guarantees fairness and maintains the packet sequence.

The input port number of a first packet to be output is retrieved from the first port number buffer pnb_0 and has the value i_y.

Using the previously retrieved input port number i_y, a control logic buffer can be accessed in step 120. This control logic buffer is assigned to the crosspoint which represents the intersection of the output crossbar ocb and the input crossbar related to the input port i_y. From this control logic buffer, address information can be obtained in step 130 to get packet data which is stored in a data buffer and is referenced by said address information.

Finally, the packet data can be output at the output port of the crossbar switch 1 that corresponds to the output crossbar ocb.

Every output port of the crosspoint switch 1 is assigned a number of port number buffers within the output port scheduler 2 so that the above described process can run in parallel for all thirty-two output ports o_0, . . . , o_31 of the crossbar switch.

As already stated above, each port number buffer comprises four FIFO buffers F. Incoming packets of different priority levels are stored to that FIFO buffer that corresponds to the packet's priority level.

The presented method enables scalability since increasing the number of port number buffers is possible. Link paralleling is also supported.

The port number buffers must not necessarily be organized as FIFO buffers or be assigned to single crosspoints; it is sufficient to organize the port number buffers in a way that allows round-robin access to the stored input port numbers.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method of operating a crossbar switch having a control logic, an output port scheduler, n input ports and m output ports comprising:

receiving at one or more of said n input ports, information packets to be sent to one or more m output ports;

storing in a data buffer, said information packets;

routing with an auxiliary crossbar switch, port numbers of said n input ports receiving said packets to be routed to ones of said m output ports storing an input port number corresponding to the input port at which a new information packet is arriving and being stored in said data buffer, in round-robin mode in a port number buffer at said routed to output port; and controlling said output port scheduler with port numbers retrieved from said port numbers buffer for the routing of the sequence of packets stored in said data buffer through said auxiliary crossbar switch to said routed to output port.

2. The method according to claim 1 comprising:
retrieving input port numbers from said port number buffer in round-robin mode.

3. The method according to claim 2 comprising
accessing a control logic buffer by using a retrieved input port number; and
obtaining address information from said control logic buffer.

4. The method according to claim 3 further comprising;
retrieving packet data with said address information; and
outputting a packet comprising said packet data.

5. A crossbar switch comprising.
a control logic;
an output port scheduler;
n input ports and m output ports wherein information packets are received at one or more of said n input ports to be sent to one or more m output ports;
a data buffer for storing said information packets;
an auxiliary crossbar switch for routing port numbers of said n input ports receiving said packets to ones of said m output ports;
a port number buffer storing in round-robin mode, an input port number routed by said auxiliary crossbar switch, said port number buffer corresponding to the input port at which a new information packet is arriving and being stored in said data buffer;
said output port scheduler retrieving input port numbers from said port number buffer in round-robin mode;
a control logic buffer being accessed by using a retrieved input port number retrieved from said port number buffer, said control logic buffer providing address information of packet data in said data buffer; and
said output port scheduler retrieving packet data with said address information, arid outputting a packet comprising said packet data.

6. The crossbar switch according to claim 5 wherein m=32 and n=32.

7. The crossbar switch according to claim 5 wherein said port number buffer comprises FIFO-buffers.

8. The crossbar switch according to claim 5 wherein said port number buffer comprises p FIFO-buffers per input port number such that p is the number of different priority levels of said information packets.

9. A networking system comprising:
at least one crossbar switch having.
a control logic;
an output port scheduler;
n input ports and m output ports wherein information packets received at one or more of said n input ports to be sent to one or more m output ports;
a data buffer for storing said information packets;
an auxiliary crossbar switch for routing port numbers of said n input ports receiving said packets to ones of said m output ports;
a port number buffer storing in round-robin mode, an input port number corresponding to the input port at which a new information packet is arriving and being stored in said data buffer;
said output port scheduler retrieving input port numbers from said port number buffer in round-robin mode;
a control logic buffer being accessed by using a retrieved input port number retrieved from said port number buffer, said control logic buffer providing address information for the address of packet data in said data buffer; and
said output port scheduler retrieving packet data from said data buffer with said address information, and outputting a packet comprising said packet data.

10. The networking system according to claim 9 wherein m=32 and n=32.

11. The networking system according to claim 9 wherein said port number buffer comprises FIFO-buffers.

12. The networking system according to claim 9 wherein said port number buffer comprises p FIFO-buffers per input port number such that p is the number of different priority levels of said information packets.

* * * * *